United States Patent [19]

Kropp

[11] Patent Number: 5,398,962

[45] Date of Patent: Mar. 21, 1995

[54] HORN ACTIVATOR FOR STEERING WHEELS WITH AIR BAGS

[75] Inventor: Harry C. Kropp, Barrington, Ill.

[73] Assignee: Force Imaging Technologies, Inc., Skokie, Ill.

[21] Appl. No.: 195,215

[22] Filed: Feb. 14, 1994

[51] Int. Cl.⁶ .............................................. B60R 21/20
[52] U.S. Cl. .................................. 280/731; 200/61.54
[58] Field of Search ............... 280/728 B, 731, 728 R, 280/728 A, 735; 200/61.54, 61.55

[56] References Cited

U.S. PATENT DOCUMENTS

| 5,086,652 | 2/1992 | Kropp | 73/767 |
| 5,222,399 | 6/1993 | Kropp | 73/862.68 |
| 5,265,904 | 11/1993 | Shelton et al. | 280/731 |
| 5,265,905 | 11/1993 | Shelton | 280/731 |
| 5,269,559 | 12/1993 | Filion et al. | 280/728 B |
| 5,269,560 | 12/1993 | O'Loughlin et al. | 280/736 |
| 5,275,432 | 1/1994 | Pray et al. | 280/728 B |

FOREIGN PATENT DOCUMENTS 5-105084  4/1993  Japan .................................. 200/61.54

Primary Examiner—Karin L. Tyson
Assistant Examiner—Peter C. English
Attorney, Agent, or Firm—Laff, Whitesel, Conte & Saret

[57] ABSTRACT

A steering wheel having a pressure-sensitive horn activator integrated with an airbag assembly. The horn activator is configured for quick activation, while avoiding accidental activation due to changes in ambient temperatures and pressures.

3 Claims, 3 Drawing Sheets

HORN ACTIVATOR FOR STEERING WHEELS WITH AIR BAGS

BACKGROUND OF THE INVENTION

The present invention relates generally to a steering wheel assembly having both an airbag and a horn switch in the center of such an assembly.

Traditionally, automobile horns switches have been located in the center of steering wheels. However because the most effective location for an airbag is also in the center of the steering wheel, horn switches have been reduced in size and have been moved to locations remote from the center of the steering wheel. Thus it is viewed as desirable to have both a horn switch and an airbag assembly in the center of the steering wheel, both for convenience and to enable a driver to quickly and certainly activate the horn.

It would also be desirable to provide a horn activation system which is easily used, and which does not depend upon as precisely located applications of pressure as currently available horn activation systems require, when used with an airbag system, and which is not subject to activation by the assembly itself due to ambient temperature and pressure changes in the automobile.

SUMMARY OF THE INVENTION

It is therefore an object of the present invention to provide a horn activator integrated with an airbag assembly mounted in a steering wheel and which is configured for quick activation, while avoiding accidental activation due to changes in ambient temperatures and pressures.

In accordance with the present invention a steering wheel assembly for a self-propelled vehicle provided with a horn comprises a steering wheel, an inflatable air bag located within the perimeter of the steering wheel, and a horn activator overlying the inflatable airbag. The horn activator may preferably comprise a force sensor. Circuit means connected to the force sensor are provided for sensing the change in the force applied to the sensor during a predetermined wait period, for determining whether the change has reached a selected threshold value, and for activating or deactivating a horn if the change at least equals the selected threshold value.

Preferably the force sensor is a thin flexible sensor comprising a pair of thin backing sheets, each having an electrode thereon disposed in a confronting pattern and pressure sensitive resistive material therebetween, the resistance of the resistive material changing with changes in the force applied against the force sensor. Desirably the force sensor is disposed in a cover assembly mounted on the steering wheel and overlying the airbag.

Further objects, features and advantages of the present invention will become apparent from the following description and drawings.

DETAILED DESCRIPTION OF A PRESENTLY PREFERRED EMBODIMENT

Figure 1:
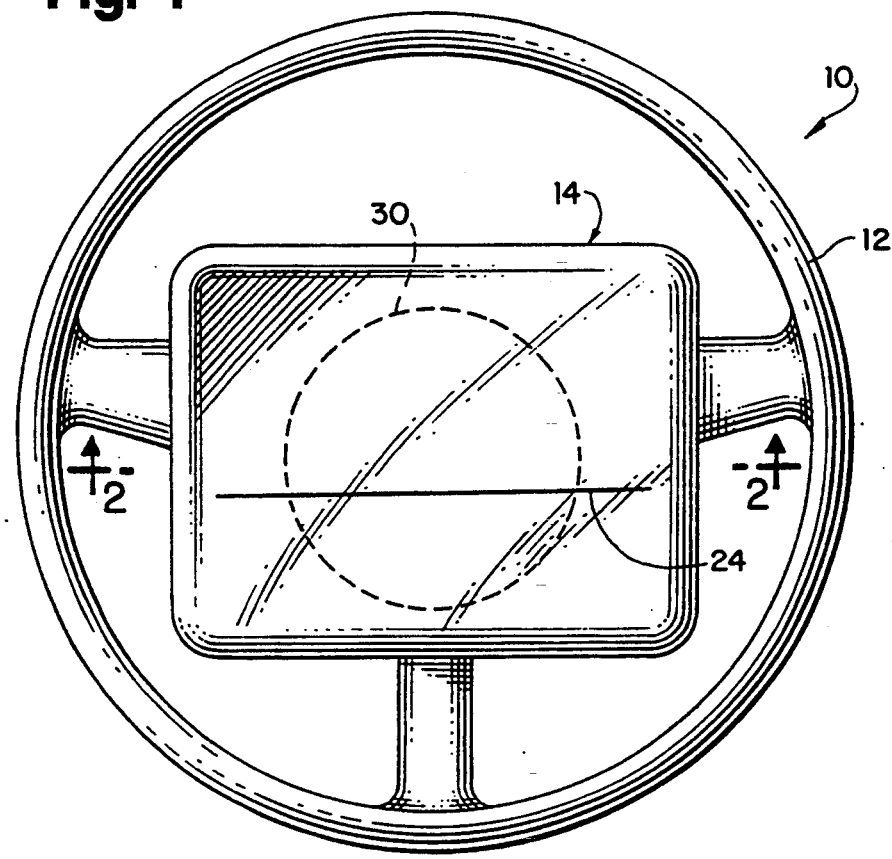
FIG. 1 is a perspective view of a steering wheel assembly incorporating the present invention.
Figure 2:
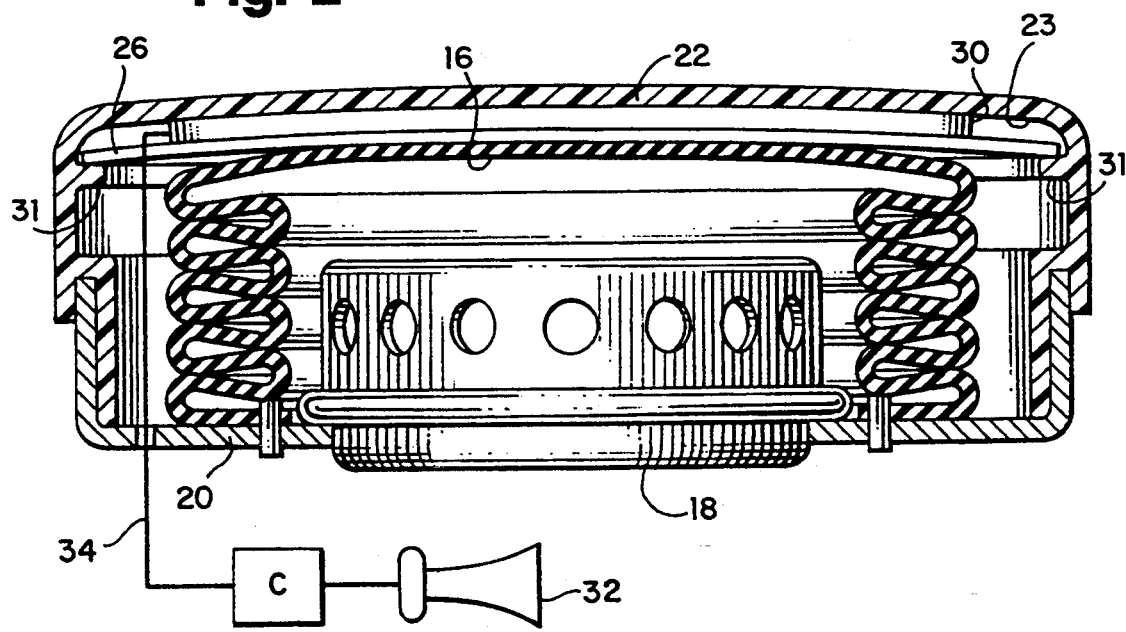
FIG. 2 is a cross-sectional view taken along line 2—2 of FIG. 1 and showing an associated horn and horn activation circuitry.

Referring now to the drawings, a steering wheel assembly 10 in accordance with the present invention includes a steering wheel 12 suitably mounted on a steering column (not shown) of a self-propelled vehicle. The steering wheel in turn supports an airbag and horn switch assembly 14 within its perimeter and generally centrally thereof. Assembly 14 includes an inflatable airbag 16, an airbag inflator 18 and a mounting plate 20 for mounting and securing the components of the assembly 14 to the steering wheel 12.

Assembly 14 also includes a cover, such as a soft, flexible outer cover 22 which overlies the airbag and which serves as a decorative cover for the assembly 14. Cover 22 defines a weakened seam 24 through which the airbag may be deployed when it is activated. A stiff, relatively rigid inner cover 26 overlying the airbag is also provided for mounting a force sensor or horn activator 30, for positioning it in a confronting relationship to the inside surface 23 of the outer cover 22, and for providing back-up in addition to or in lieu of the airbag when the outer cover 22 is pressed to activate the horn. The horn activator 30 may be secured between the covers 22, 26, as by integrally formed tabs 31 on the outer cover or by suitable fasteners. Horn activator 30 is connected to the automobile horn 32 via suitable conductors 34 and circuitry C. The horn activator 30 may be positioned above the seam 24 so that it does not interfere with deployment of the airbag 16, or it may be positioned across the seam as shown because it is so lightweight that it will not interfere with deployment of the airbag and should not injure a user if expelled with the airbag. Cover 26 may have flexible seams located in accordance with known art practices to permit the airbag to be deployed therethrough.

The horn activator 30 may be a conventional force sensor, such as one made in accordance with U.S. Pat. Nos. 5,222,399 and 5,086,652, and may be from 0.002 to 0.005 inches in thickness. Activator sensor 30 may comprise a pair of thin, flexible plastic backing sheets 40, as of a polyester film. Each is provided a suitable electrode pattern, such as the circular pattern shown in FIG. 3. The electrodes 42 may be silver, may be screen printed on the backing sheets, and are disposed in a known manner in a confronting or crossing pattern. A pressure sensitive resistive material, deposited as by a screen-printing process, may be interposed between the confronting electrodes. The pressure sensitive resistive material 44 may be a carbon-molybdenum disulfide material in an acrylic binder.

Each of the electrodes 42 terminates in a conductor 46 which in turn terminates in a suitable contact 48. The contacts 48 are connected, via suitable conductors 34, to circuitry C which can determine the resistance and changes in resistance between the confronting electrodes, and which can process and provide outputs as desired.

Thus it will be apparent that when a horn is to be activated, the operator of an automobile need only apply force to the outer cover. In turn that will cause the horn activator 30 to produce an output which will activate the horn.

It is important, however, to avoid false activation of the horn. It has been determined that pressure sensitive force sensors can be sensitive to changes in ambient temperatures and pressures when they are positioned between steering wheel assembly members that can expand or contract or can change their shapes as temperatures and pressure rise and change. Thus, for example, if a steering wheel assembly such as that shown in the drawings and described herein, is exposed to elevated temperatures, the airbag can expand or the outer or inner covers can change shape, and sufficient force can be applied to the horn activator 30 such that it will be squeezed. If simply applying a load to a load sensor is used as the vehicle for activating a horn, then it can be caused to activate accidentally. False activation is avoided in accordance with the present invention.

Figure 5:
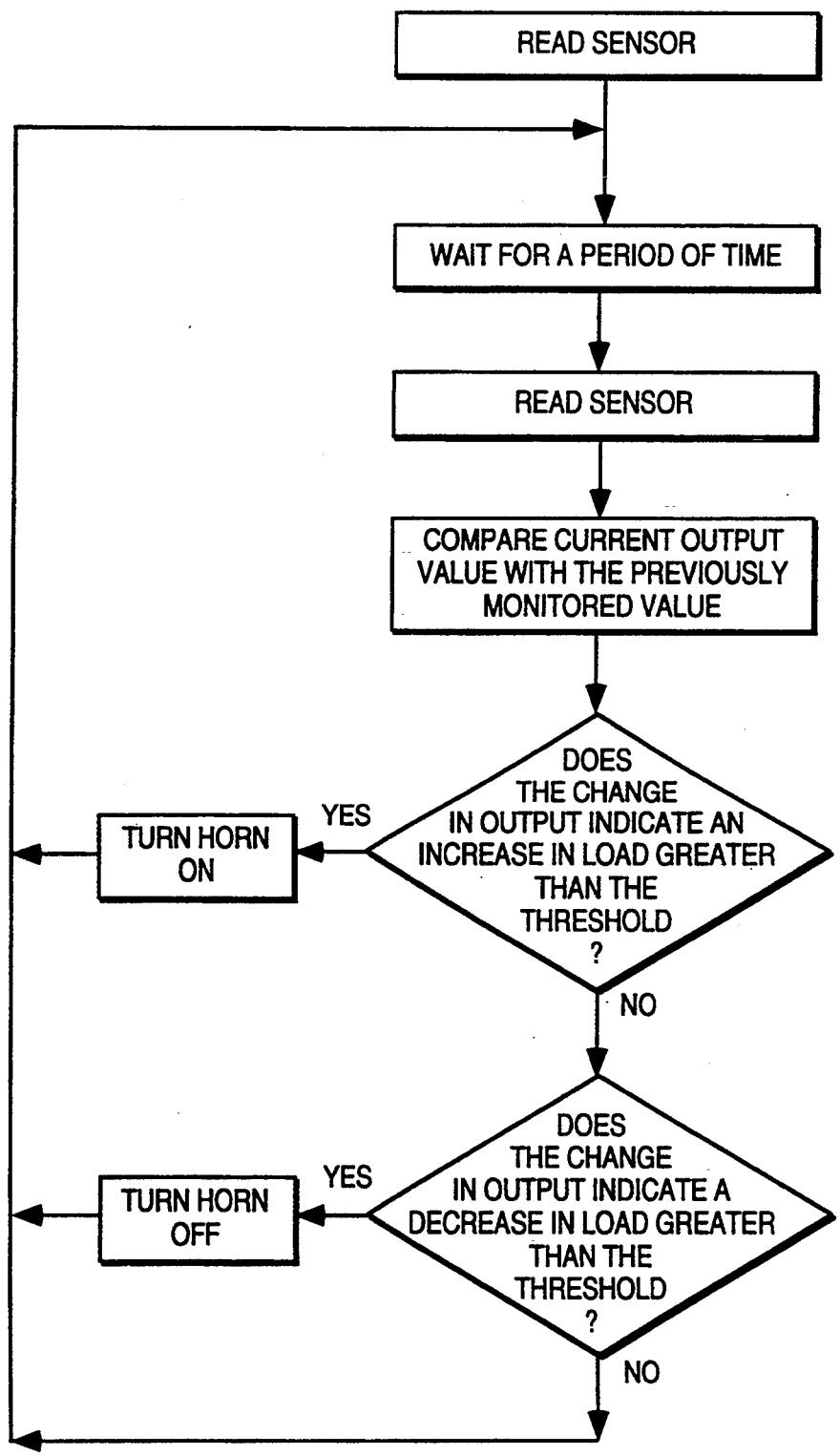
FIG. 5 is a flow diagram of the logic used to activate and deactivate a horn.

Referring now to FIG. 5, the load or force applied to horn activator 30 is read periodically, say every 250 milliseconds. Each reading is converted to arbitrarily selected values having a range of from 1 through 255, where higher values represent higher loads or applications of force. When a preselected value change, say of 10 which has been selected as the threshold change which must be read in a wait period of 250 milliseconds to activate or deactivate the horn, is detected as having occurred during a predetermined wait period, the horn will be sounded.

In use, a first value of apparent applied force is read. Then a second reading is taken 250 milliseconds later to provide a second value. Assuming, for example, a first value of a quiescent force sensor is 125 and the second value is 126, neither an increase nor a decrease of a value change of 10 is sensed, and the horn is neither activated nor deactivated.

If the sensor is pressed sharply, the value of the applied force will obviously change substantially in a very short time period. Thus, if a first reading is 125, a rapidly applied force against the horn activator might produce a second reading of say 160 just 250 milliseconds later. This difference of 35 exceeds the preset threshold value of 10 during the predetermined wait period and will permit the horn to be switched on. If the force applied to the horn activator is thereafter rapidly relieved, a drop of greater than 10 in the wait period of 250 milliseconds will result in the horn being deactivated.

Thus it is apparent that gradual increases in forces applied against the horn activator 30 will have no affect on horn activation and that only rapid or sharp applications of force to the horn activator (or rapid removal of force from the horn activator) will activate and deactivate the horn. Thus, if, for example, an automobile heats up internally, as when parked on a hot day, and the airbag and horn activator assembly heat up resulting in the application of force to the horn activator, the gradual increase in applied force over an extended period of time will not activate the horn. However, when the automobile is placed in use, even if the activator remains under load due to elevated temperature conditions, the rapid application of force to the horn activator will cause the horn to operate as desired. As such whether the horn activator 30 is under no load or under a relatively high load in a quiescent state, the horn will be activated (or deactivated) only as desired and in accordance with conventionally understood usage practices.

Figure 3:
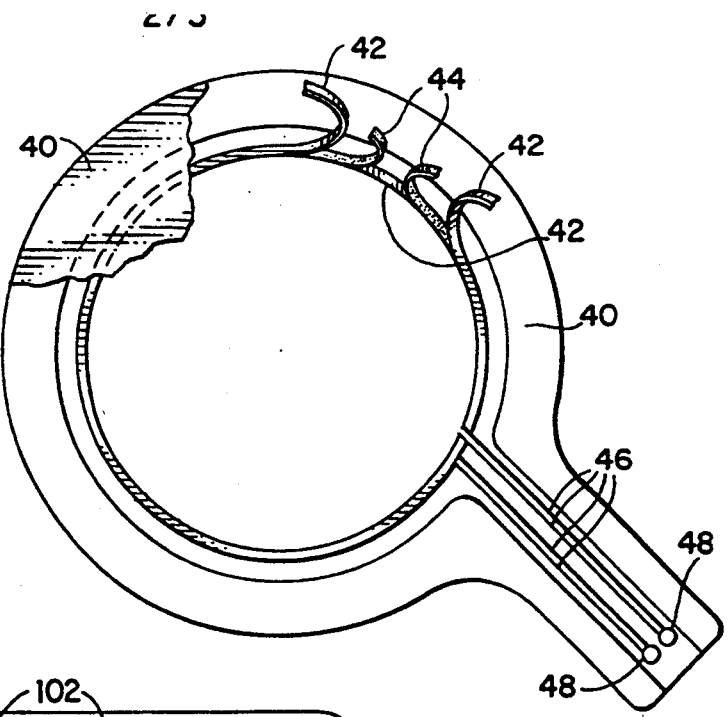
FIG. 3 is a plan view of a sensor which may be employed with the steering wheel assembly of FIG. 1.
Figure 4:
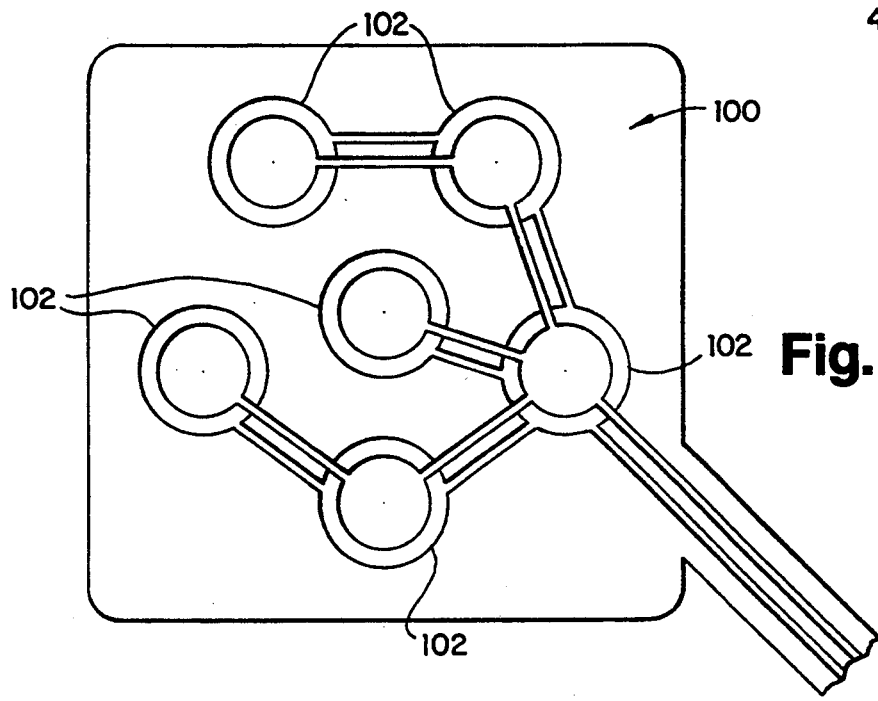
FIG. 4 is a plan view of a further sensor which may be employed with the steering wheel assembly of FIG. 1.

Although a sensor 30 as shown in FIG. 3 may be used, other sensors and transducers from which suitable outputs may be obtained may be used as well. Thus a sensor 100 as shown in FIG. 4 may be used in place of sensor 30. Sensor 100 is similarly made, but has a series of electrode pairs 102 which provide greater coverage in the horn activation zone, thereby to provide enhanced horn activation characteristics. Still other activators may be used, such as pressure sensitive grid sensors having configurations exemplified by Lewis British Patent Application GB 2115556A, published on Sep. 7, 1983, as well as piezoelectric pressure responsive transducers, among others.

Figure 6:
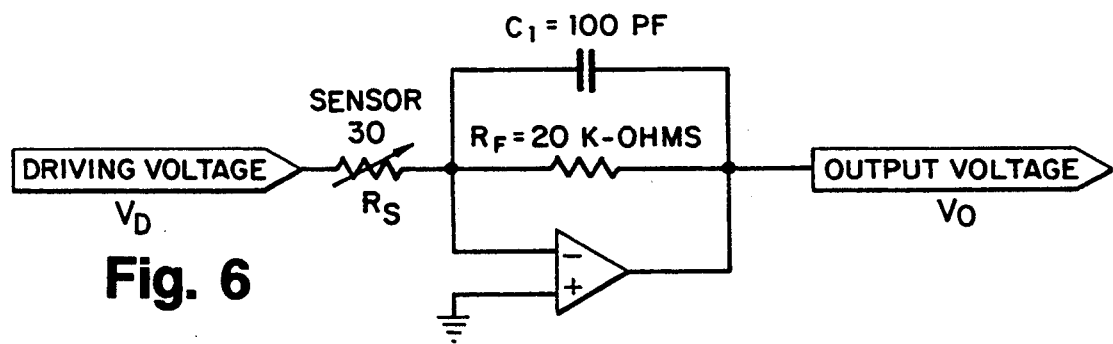
FIG. 6 is a circuit diagram of the circuit used with the steering wheel assembly of FIG. 1.

Typical circuitry C for reading a force sensor 30 and for providing outputs as to which changes may be observed and decisions made as to whether a horn should be activated or deactivated in accordance with the logic provided by FIG. 5 is shown in FIG. 6. As there shown, sensor 30 is, in effect, a variable resistor, the output of which varies with the force applied thereto. The resistance of sensor 30 is determined by using an inverting op-amp circuit to read the resistance of the load sensor. Thus a −5 direct current voltage is applied to the sensor. The relationship of the op-amp circuit is such that the sensor resistance ($R_S$) is equal to the product of the reference resistance ($R_F$) and the driving voltage ($V_D$) divided by the output voltage ($V_O$) according to the formula:

$$V_O = V_D \times \frac{R_F}{R_S}.$$

The resulting output voltage range is converted to a digital range of 1 to 255 by a typical 8-bit analog to digital circuit. Increasing values indicate increasing applied force. These values are used in a microprocessor to provide readings every 250 milliseconds when the automobile is in a mode in which horn activation may be desirable.

From the foregoing it will be apparent to those skilled in the art that other assemblies and methods of using same may be devised without departing from the spirit and scope of the invention. As such it is intended that the invention is not to be construed as being limited by the specific embodiments illustrated.

What is claimed is:

1. A steering wheel assembly for use in a vehicle having a horn, said assembly comprising a steering wheel, an inflatable air bag located within the perimeter of the steering wheel, and a horn activator overlying the inflatable airbag, said horn activator comprising a force sensor, and circuit means connected to said force sensor for sensing the change in the force applied to said sensor during a predetermined period, for determining whether the change has reached a selected threshold value, and for activating a horn if said change at least equals said selected threshold value.

2. A steering wheel assembly in accordance with claim 1, and wherein said force sensor is a thin flexible sensor comprising a pair of thin backing sheets, each having an electrode thereon disposed in a confronting pattern and pressure sensitive resistive material therebetween, the resistance of said resistive material changing with changes in the force applied against said force sensor.

3. A steering wheel assembly in accordance with claim 1 and wherein said force sensor is disposed in a cover assembly mounted on said steering wheel and overlying said airbag.

* * * * *